(12) United States Patent  
Ikeda

(10) Patent No.: US 7,778,724 B2
(45) Date of Patent: Aug. 17, 2010

(54) DEVICE FOR ESTIMATING MACHINING DIMENSION OF MACHINE TOOL

(75) Inventor: Kazutaka Ikeda, Gose (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 196 days.

(21) Appl. No.: 11/902,546

(22) Filed: Sep. 24, 2007

(65) Prior Publication Data

US 2008/0082200 A1    Apr. 3, 2008

(30) Foreign Application Priority Data

Sep. 29, 2006    (JP) .............................. 2006-269511

(51) Int. Cl.
*G06F 19/00*    (2006.01)

(52) U.S. Cl. ...................... 700/175; 700/186; 409/235; 82/163; 73/587

(58) Field of Classification Search ................ 700/174, 700/175, 186; 409/234, 235; 82/163; 73/587
See application file for complete search history.

(56) References Cited

U.S. PATENT DOCUMENTS

| 5,283,418 | A | | 2/1994 | Bellows et al. |
| 5,579,232 | A | | 11/1996 | Tong et al. |
| 6,041,271 | A | * | 3/2000 | Lindstrom ................... 700/175 |
| 6,311,098 | B1 | * | 10/2001 | Higasayama et al. ........ 700/159 |
| 6,884,204 | B2 | * | 4/2005 | Watanabe ..................... 483/12 |
| 2004/0179915 | A1 | * | 9/2004 | Hill et al. ..................... 409/131 |

FOREIGN PATENT DOCUMENTS

| GB | 2 277 151 | 10/1994 |
| JP | 2-124264 | 5/1990 |
| JP | 3-035952 | 2/1991 |
| JP | 7-098694 | 4/1995 |
| JP | 2004-354111 | 12/2004 |
| WO | 95/11488 | 4/1995 |

* cited by examiner

*Primary Examiner*—Albert DeCady
*Assistant Examiner*—Douglas S Lee
(74) *Attorney, Agent, or Firm*—Bacon & Thomas, PLLC

(57) ABSTRACT

A device for estimating machining dimensions of a machine tool which employs tool members each being rotatably driven by a driving unit includes: a vibration sensor; a characteristics extracting unit for extracting amounts of characteristics from an output of the vibration sensor; a neural network for classifying the amounts of characteristics into categories; and a conversion unit. Amounts of characteristics of generated output by racing the tool member are used for training the neural network, and inputted again to the trained competitive learning neural network to excite neurons so that the relationships between Euclidean distances and machining dimensions of workpieces are registered in the conversion unit. The Euclidean distances are obtained between weight vectors of the excited neurons and respective corresponding training samples, and the machining dimensions are obtained when the workpieces are machined by the tool members at the same condition as the respective corresponding training samples are obtained.

8 Claims, 3 Drawing Sheets

DEVICE FOR ESTIMATING MACHINING DIMENSION OF MACHINE TOOL

FIELD OF THE INVENTION

The present invention relates to a device for estimating machining a dimension of a machine tool; and, more particularly, to a device for estimating, prior to machining a workpiece, a machining dimension of a machine tool which has tools rotatably driven by a driving unit including a driving source such as a motor, depending on attachment states of the tools.

BACKGROUND OF THE INVENTION

Conventionally, in an automatic tool changer of a numerical control machine tool, there has been proposed a device to monitor an anomaly in tool change operation of a tool change arm (see, e.g., Japanese Patent Laid-open Application No. H11-333657). The device detects torque waveform pattern of a driving motor generated when the tool change arm is at various positions on a track thereof being made while performing the change operation. The detected torque waveform pattern is compared with that of the driving motor generated while the tool change arm operated normally, thereby detecting an anomaly in the tool change operation. As for the comparison of the torque waveform patterns, an amount of error in a torque value of the tool change arm performing the change operation is computed at every identical positions and it is checked whether the amount of error is within an allowable range or not to judge an anomaly in the tool change operation.

The device in the Patent Reference supra accomplishes the technical task of preventing damages of a machine tool and a workpiece by monitoring whether an anomaly caused by a fabrication error in the tool change arm exists in the tool change operation or not. In the Patent Reference, torque waveform patterns for a plurality of tools held in a tool magazine are pre-obtained in consideration of weight differences thereof and are stored. Then, when a tool is replaced with another, a torque waveform pattern corresponding to the another tool is used.

The technology in Patent Reference is for detecting an anomaly in the automatic tool changer. Therefore, a tool is regarded as being attached properly to the driving unit if the automatic tool changer is normally operating. However, even if the tool is adequately attached to the driving unit not to incur difficulties in machining a workpiece, some errors in a machining dimension can occur due to, e.g., misalignment of shaft axis, and improper attachment wear, and broken edges of the tool. An acceptable range of error is defined in terms of a tolerance. Therefore, there is no problem if the machining dimension is within the tolerance range, but if the machining dimension is out of the tolerance range, the machined workpiece is deemed to be defective. The machining dimension can be known only after completing the machining, resulting in a waste of workpiece.

SUMMARY OF THE INVENTION

In view of the above, the present invention provides a device for estimating a machining dimension of a machine tool prior to machining a workpiece to thereby reduce the waste of the workpiece caused by the machining dimension falling outside of the tolerance.

In accordance with one aspect of the present invention, there is provided a device for estimating machining dimensions of a machine tool which employs one or more tool members each being rotatably driven by a driving unit, the device including: a vibration sensor for detecting vibrations generated from the driving unit; a characteristics extracting unit for extracting amounts of characteristics having a plurality of parameters from a target signal which is an output of the vibration sensor; a competitive learning neural network for classifying the amounts of characteristics extracted by the characteristics extracting unit into categories; a conversion unit for converting, into a machining dimension for a workpiece, the Euclidean distance between an amount of characteristics of a target signal generated by racing a tool member attached to the driving unit and a weight vector of an excited neuron for the competitive learning neural network which has been trained; and an output unit for outputting the machining dimension for the workpiece from the conversion unit as an estimated dimension.

Amounts of characteristics of the target signal generated by racing the tool member which is normally attached to the driving unit serve as training samples of the tool member for training the competitive learning neural network. The training samples are inputted again to the trained competitive learning neural network to excite neurons so that the relationships between Euclidean distances and machining dimensions of workpieces are registered in the conversion unit. The Euclidean distances are obtained between weight vectors of the excited neurons and respective corresponding training samples, and the machining dimensions are obtained when the workpieces are machined by the tool members at the same condition as the respective corresponding training samples are obtained.

In this configuration, the machining dimension is estimated by using amounts of characteristics from output of the vibration sensor based on a point that a distribution of amounts of characteristics from the output of the vibration sensor while a tool member attached to a machine tool are racing and a distribution of machining dimensions when workpieces are machined by the corresponding tool member are related. Since machining dimension is estimated prior to machining the workpiece, it is prevented that a workpiece is not machined precisely due to an unproperly attached tool member. As a result, fabricating a defective workpiece is prevented.

It is preferable that the machine tool is configured to automatically change two or more tool members held in a tool magazine in an instructed order, wherein the neural network is trained by using training samples for each tool member, and wherein the conversion unit changes the relationship between the Euclidean distances and the machining dimensions when receiving an instruction to change the tool member in the machine tool.

In this configuration, even if there are various kinds of tool members, the machining dimensions of respective kinds of tools can be estimated. Therefore, even in case of a machining center or the like which performs machining by automatically replacing a tool member with another, a workpiece is prevented from being machined wastefully by estimating machining dimensions of respective tools.

It is also preferable that if the machining dimension from the conversion unit is out of a tolerance range, the output unit judges that the tool member is defectively attached to the driving unit.

According to this configuration, not only estimating a machining dimension but also detecting a defective attachment state of a tool member can be performed.

In accordance with another aspect of the present invention, there is provided a method for estimating machining dimensions of a machine tool which employs one or more tool members each being rotatably driven by a driving unit, the method includes: detecting vibrations generated from the driving unit; extracting amounts of characteristics having a plurality of parameters from a target signal which is from the detected vibrations; classifying the amounts of characteristics into categories by using a competitive learning neural network for; converting, into a machining dimension for a workpiece, the Euclidean distance between an amount of characteristics of a target signal generated by racing a tool member attached to the driving unit and a weight vector of an excited neuron for the competitive learning neural network which has been trained; and outputting the machining dimension for the workpiece as an estimated dimension.

In this aspect of the present invention, amounts of characteristics of the target signal generated by racing the tool member which is normally attached to the driving unit serve as training samples of the tool member for training the competitive learning neural network. The training samples are inputted again to the trained competitive learning neural network to excite neurons so that the relationships between Euclidean distances and machining dimensions of workpieces are registered. The Euclidean distances are obtained between weight vectors of the excited neurons and respective corresponding training samples, and the machining dimensions are obtained when the workpieces are machined by the tool members at the same condition as the respective corresponding training samples are obtained.

It is preferable that the machine tool is configured to automatically change two or more tool members held in a tool magazine in an instructed order, wherein the neural network is trained by using training samples for each tool member, and wherein the relationship between the Euclidean distances and the machining dimensions is changed when receiving an instruction to change the tool member in the machine tool.

It is also preferable that if the machining dimension is out of a tolerance range, it is judges that the tool member is defectively attached to the driving unit.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Embodiments of the present invention will now be described with reference to the accompanying drawings which form a part hereof.

A machine tool exemplified in an embodiment described below is a machining center or a turning center in which a tool to be used is automatically selected according to a program from a plurality of tools held in a tool magazine and is automatically mounted to a driving unit. However, the present invention can be also applicable to a machine tool with a single function if a tool is rotatably driven by a driving unit having a driving source such as a motor. Any driving source using a motor can serve as a driving unit, and a proper power transmission unit such as a gearbox or a belt can be provided between the driving source and the tool. Hereinafter, a spindle with a housing is exemplified as a driving unit.

Figure 1:
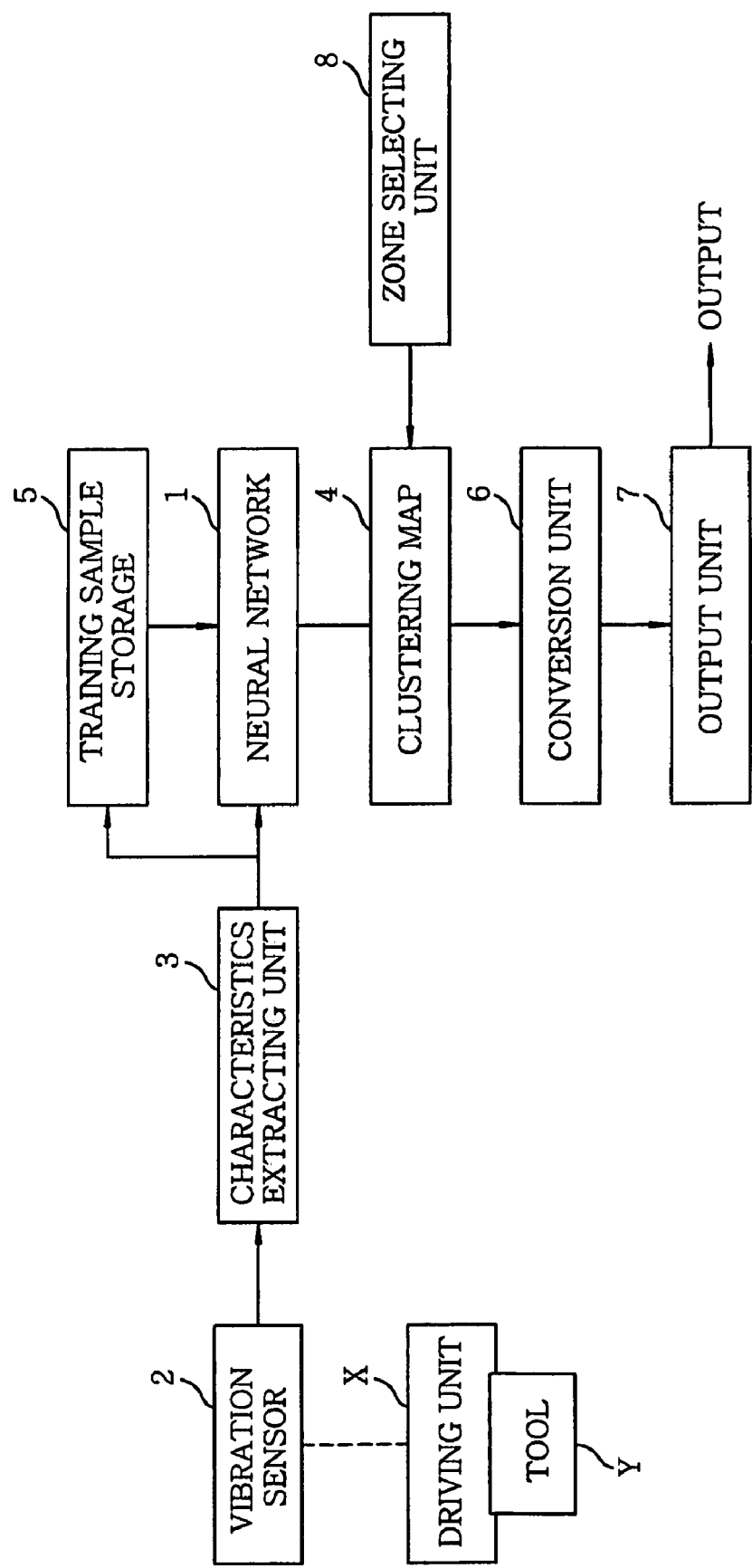
FIG. 1 is a block diagram of a desire for estimating machining dimensions of a machine tool in accordance with an embodiment of the present invention.

As shown in FIG. 1, a device for estimating machining dimensions of a machine tool described in the present embodiment uses, e.g., an unsupervised competitive learning neural network 1 (hereinafter, simply referred to as neural networks if not otherwise necessary for some purpose). Training of the neural network can be made only once by using training samples of every category, or can be enhanced further by performing additional training.

Figure 2:
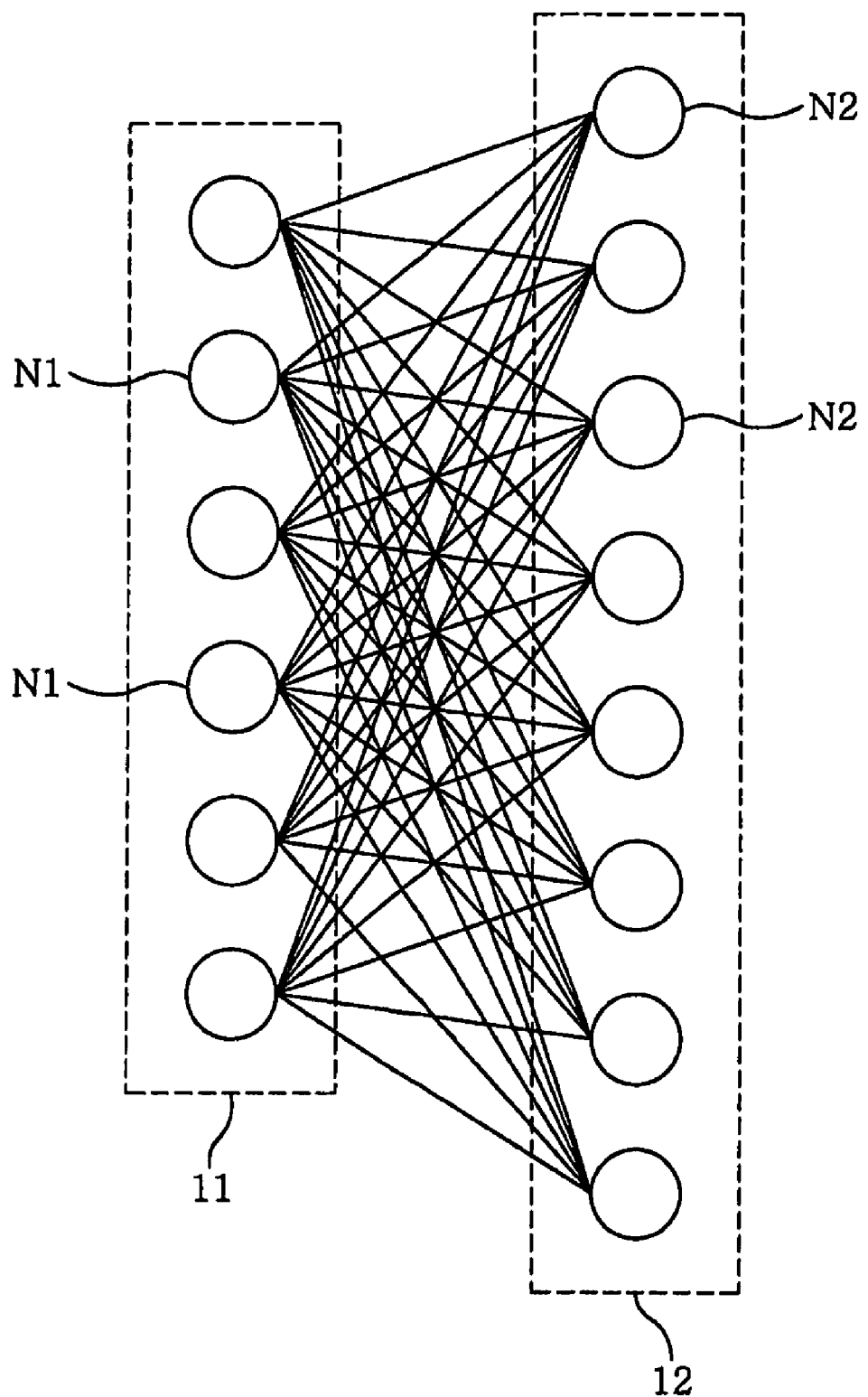
FIG. 2 illustrates a schematic configuration of a neural networkpiece used in the embodiment in FIG. 1.

As shown in FIG. 2, the neural network 1 has two layers, i.e., an input layer 11 and an output layer 12, and is configured such that every neuron N2 of the output layer 12 is connected to all neurons N1 of the input layer 11. In the embodiment, the neural network 1 may be executed by an application program running at a sequential processing type computer, but a dedicated neuro-computer may be used.

The neural network 1 has two modes of operations, i.e., a training mode and a checking mode. After learning through proper training samples in the training mode, an amount of characteristics (check data) which is generated from an actual target signal and includes a plurality of parameters is classified into a category in the checking mode.

A coupling degree (weight coefficients) of the neurons N1 of the input layer 11 and the neurons N2 of the output layer 12 constituting the neural network 1 is variable. In the training mode, the neural network 1 is trained by inputting training samples to the neural network 1 so that respective weight coefficients of the neurons N1 of the input layer 11 and the neurons N2 of the output layer 12 are decided. In other words, every neuron N2 of the output layer 12 is assigned with a weight vector having the weight coefficients associated with all the neurons N1 of the input layer 11 as elements of the weight vector. Therefore, the weight vector has same number of elements as the number of neurons N1 in the input layer 11, and the number of parameters of the amount of characteristics inputted to the input layer 11 is equal to the number of the elements of the weight vector.

In the checking mode, when check data whose category is to be decided is given to the input layer 11 of the neural network 1, a neuron N2 lying closest to the check data, i.e., a neuron N2 having the shortest Euclidean distance between its weight vector and the check data, is excited among the neurons N2 of the output layer 12. If categories are assigned to the neurons N2 of the output layer 12 in the training mode, a category of the check data can be recognized through a category of a location of the excited neuron N2.

The neurons N2 of the output layer 12 are associated with zones of a two-dimensional clustering map 4 having, e.g., 6*6 zones in one-to-one correspondence. Therefore, if categories of the training samples are associated with the zones of the clustering map 4, a category corresponding to a neuron N2 excited by check data can be recognized through the clustering map 4. Thus, the clustering map 4 can function as an output part for outputting a classified result.

When associating categories with the zones of the clustering map 4 (actually the neurons N2 of the output layer 12), a trained neural network 1 is operated in the reverse direction from the output layer 12 to the input layer 11 to estimate data assigned to the input layer 11 for every neuron N2 of the output layer 12. A category of a training sample having the shortest Euclidean distance with respect to the estimated data is used as a category of a corresponding neuron N2 in the output layer 12. In other word, a category of a training sample having the shortest Euclidean distance with respect to a weight vector of a neuron N2 is used for a category of the corresponding neuron N2 of the output layer 12. As a result, the categories of the training samples are reflected to the categories of the neurons N2 of the output layer 12.

Further, if a large number of training samples (for example, 150 samples) are employed, highly similar categories are arranged close together in the clustering map. In other words, the neurons N2 excited from the neurons N2 of the output layer 12 in response to training samples belonging to like categories form a cluster formed of a group of neurons N2 residing close together in the clustering map 4.

A clustering map 4 is originally the one in which clusters are formed in association with categories after training, but in this embodiment even the one before training is also called a clustering map 4 so that both of them are not distinguished. The training samples given to the neural network 1 operating in the training mode are stored in a training sample storage 5 and retrieved therefrom to be used in the neural network 1 when necessary.

Information to be detected by using the neural network 1 is an attachment state of a tool Y mounted to a driving unit X (FIGS. 3 and 4) to ultimately estimate a dimension of the machined workpiece; and thus the tool Y needs to be properly or normally mounted to the driving unit X. Therefore, it is sufficient to detect a normal state by using a category and an anomaly is judged when the normal state is not detected. Further, since different tools Y are alternately mounted to the driving unit X, normal state is needed to be detected with respect to every tool Y.

Figure 3:
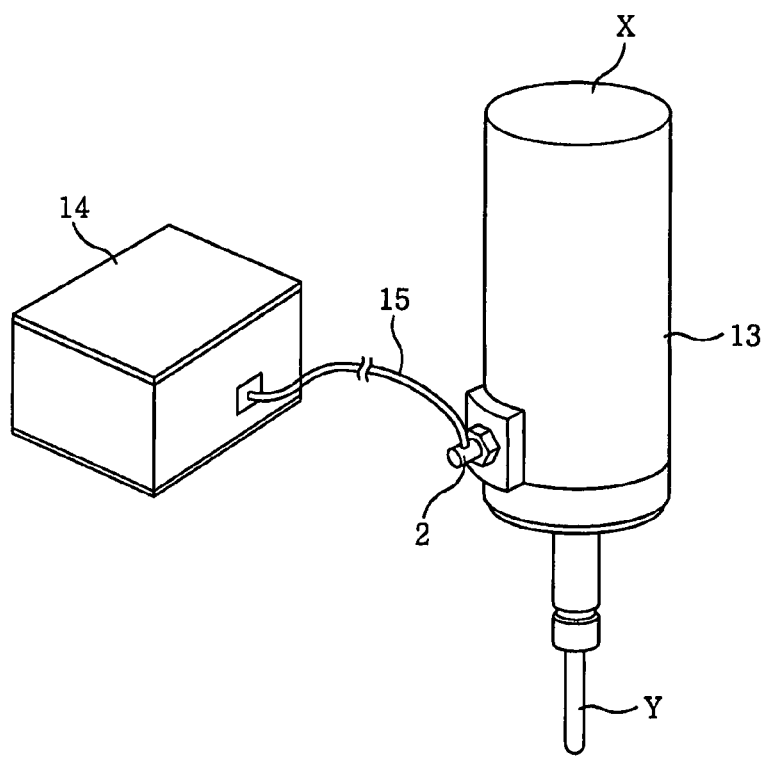
FIG. 3 describes a schematic perspective view showing a configuration of the embodiment.

In order to judge an attachment state of the tool Y mounted to the driving unit X, an output of a vibration sensor 2 tightly installed on the driving unit X is used as a target signal to be checked. An acceleration pick-up or the like can be employed as the vibration sensor 2 and the vibration sensor 2 is tightly attached on an outer peripheral surface of a housing 13 of the driving unit X as shown in FIG. 3. The vibration sensor 2 is required to be attached to the driving unit X without hampering the operation of the driving unit X and the attachment state thereof needs not to be changed by the operation of the driving unit X. Therefore, the vibration sensor 2 may be preferably fixed to the housing 13 of the driving unit X by adhesion or welding. Alternatively, in order to detachably mount the vibration sensor 2, a configuration, in which, e.g., a jig capable of detachably mounting the vibration sensor 2 is fixedly attached to the housing 13, can be enlarged.

Electric signals outputted from the vibration sensor 2 are transmitted to a characteristics extracting unit 3 as target singnals. The characteristics extracting unit 3 extracts amounts of characteristics, each amount including a plurality of parameters, from the target signal. The amounts of characteristics can be adaptively extracted to attributes considered in the target signal. In the present embodiment, frequency components (power at every frequency bandwidth) of the target signal are targeted. Since the driving unit X in this embodiment is exemplified as the spindle, an output of the vibration sensor 2 is periodic. An extracted amount of characteristics varies depending on a position on a time axis of the output of the vibration sensor 2 from which the amount of characteristics is extracted. Therefore, prior to the extraction of amounts of characteristics, pre-processing is required to regulate the positions where amounts of characteristics are extracted from outputs of the vibration sensor 2.

Therefore, the characteristics extracting unit 3 performs dividing (segmentation) of the target signal on the time axis, e.g., by using a timing signal (trigger signal) synchronous with the operation of the driving unit X or by using wave characteristics of the target signal (for example, a start point and an end point of an envelop of the target signal). In the segmentation of the target signals, only a single segmented signal need not be outputted from one period of the target signal, but a plurality of segmented signals may be made per every proper unit time. The characteristics extracting unit 3 extracts one set of amount of characteristics including a plurality of parameters from one segmented signal.

For the pre-processing, the characteristics extracting unit 3 has a buffer to temporally store the target signal received from the vibration sensor 2. Further, the characteristic extracting unit 3 performs, e.g., limitation of a frequency bandwidth in the pre-processing in order to reduce noises. Further, the characteristics extracting unit 3 has a function of converting the target signal transmitted from the vibration sensor 2 into digital signals.

The characteristics extracting unit 3 may use, e.g., FFT (Fast Fourier Transform) or a filter bank having a plurality of bandpass filters in order to extract the frequency components. Frequency components to be used in the amount of characteristics are decided depending on the type of the driving unit X and/or the tool Y to be employed. The amounts of characteristics obtained from the characteristics extracting unit 3 are stored in the training sample storage 5 when training samples are collected prior to the training mode. In the checking mode, the amounts of characteristics are provided to the neural network 1 whenever the amounts of characteristics are extracted, wherein the amounts of characteristics are served as check data and the neural network 1 classifies the check data into categories.

The data stored in the training sample storage 5 may be called a data set and it is assumed that each data in the data set corresponds to the state where the tool Y properly attached to the driving unit X. That is, stored in the training sample storage 5 is a set of data belonged to normal categories. The number of data forming the data set can be arbitrarily decided within a range of a capacity of the training sample storage 5. However, it is preferable that about 150 of data are used to train the neural network 1 aforementioned.

Since only the set of data belonging to the normal categories is stored in the training data storage 5, the neural network 1 learns only a normal state if the neural network 1 in the training mode is trained by using the data set stored in the training sample storage 5. In other word, since only the normal categories are associated with the zones of the clustering map 4, the above-described operation of the trained neural network 1 in the reverse direction to associate the zones in a clustering map 4 with categories can be omitted.

Since the present invention carries out estimating the machining dimensions in a normal attachment state where the tool Y is properly installed to the driving unit X, the correspondence between the machining dimensions and the target signals used to obtain the training samples needs to be obtained. Therefore, a workpiece is machined in the same condition as the target signal used to obtain the training samples is gained in order to obtain an actual measurement value of the machining dimension at that condition. The measured machining dimensions are associated with the respective training samples. The obtained actual measurement values of the machining dimensions are registered in the training data storage 5 by using an input device such as a keyboard.

When the neural network 1 is trained as aforementioned, every neuron N2 in the output layer 12 is assigned with a weight vector having the weight coefficients associated with all the neurons N1 of the input layer 11 as elements of the weight vector. Therefore, a training sample belonging to a category is assigned to the neural network 1 in the checking mode, a neuron N2 associated with the category is excited.

After the neural network 1 completes the learning, the training mode is finished and data registration is carried out for the data is stored in a conversion unit 6. That is, the training samples are inputted again to the neural network 1 and the Euclidean distance between the weight vector of the excited neuron N2 in the output layer 12 and every inputted training sample is computed. The weight vector of the excited neuron N2 corresponds to an amount of characteristics around a center of training sample distribution. Therefore, the greater the computed Euclidean distance is, the worse the regression of an amount of characteristics is. In other words, it is expected that the machining dimension is closer to an actual value as the Euclidean distance to the weight vector of the excited neuron N2 is shorter; and the machining dimension is further away from the actual value as the Euclidean distance to the weight vector of the excited neuron N2 is greater. This relation varies depending on kinds of the workpiece, the driving unit X, and the tool Y, but there is a view that this relation is substantially linear in case of using a drill bit as the tool Y.

Therefore, the relationship between Euclidean distances computed from the training samples as aforementioned and the actual measurement values of machining dimension with respect to the corresponding training samples is computed. When it is predicted that the relationship can be defined as a function, the relationship is automatically computed by applying the least square method or the like to be registered in the conversion unit 6. When the relationship is defined as a function, a proper rule such as, e.g., using a mean value for each a plurality of divided sections, can be applied to make a data table and the data table is registered in the conversion unit 6.

If the check data is given to the neural network 1 in the checking mode after training the neural network 1 in the training mode and registering the relationship between a Euclidean distance and a machining dimension in the conversion unit 6, the conversion unit 6 can compute, from the check data, the machining dimension depending on the attachment state of the tool Y to the driving unit X. The machining dimension is displayed for a user in display unit or the like attached to an output unit 7.

Here, if the attachment state of the tool Y to the driving unit X is not normal, a neuron N2 which does not belong to the normal categories is excited by the check data so that an anomaly can be detected. Further, the conversion unit 6 estimates the machining dimension as aforementioned. Therefore, if the estimated machining dimension is out of a specific threshold (predetermined tolerance range, for example), an anomaly in the attachment state can be detected even if a neuron N2 belonged to the normal categories is excited. The output unit 7 performs such judgment of the anomaly. Therefore, when the anomaly is detected, the anomaly is notified through the display unit. To notify the anomaly, the output unit 7 may turn on a lamp or generate alarm sounds.

The neural network 1, the characteristic extracting unit 3, the clustering map 4, the training sample storage 5, the conversion unit 6, and the output unit 7 (excluding display unit, lamp, and the like) are accommodated in a single housing 14 to be disposed separately from the vibration sensor 2. The housing 14 and the vibration sensor 2 are connected through a sensor line 15. The sensor line 15 is attached to the vibration sensor 2 and attachably and detachably connected with the housing 14 by a connector or the like. Further, it is preferable that a shielded line is used as the sensor line 15 to prevent the target signal from being mixed with noise components through the sensor line 15.

In actual use, the driving unit X to which the tool Y is mounted is freely rotated without load (i.e., without in contact with the workpiece) to obtain an output of the vibration sensor 2 as the target signal. This process is applied to gain not only the check data but also the training samples. In the checking mode, if anomaly in the attachment state of the tool Y is detected or if the estimated machining dimension is judged to be out of the tolerance range, the driving unit X is stopped and the anomaly is notified before the tool Y contacts with the workpiece.

As described above, the machining dimension of the workpiece by the tool Y is estimated based on the output of the vibration sensor 2 generated by racing or freely rotating the driving unit X. Therefore, if the machining dimension is estimated to be beyond the specific threshold (or tolerance range) or if the attachment state of the tool Y to the driving unit X is defective, the driving unit X can be stopped before the tool Y contacts with the workpiece.

Figure 4:
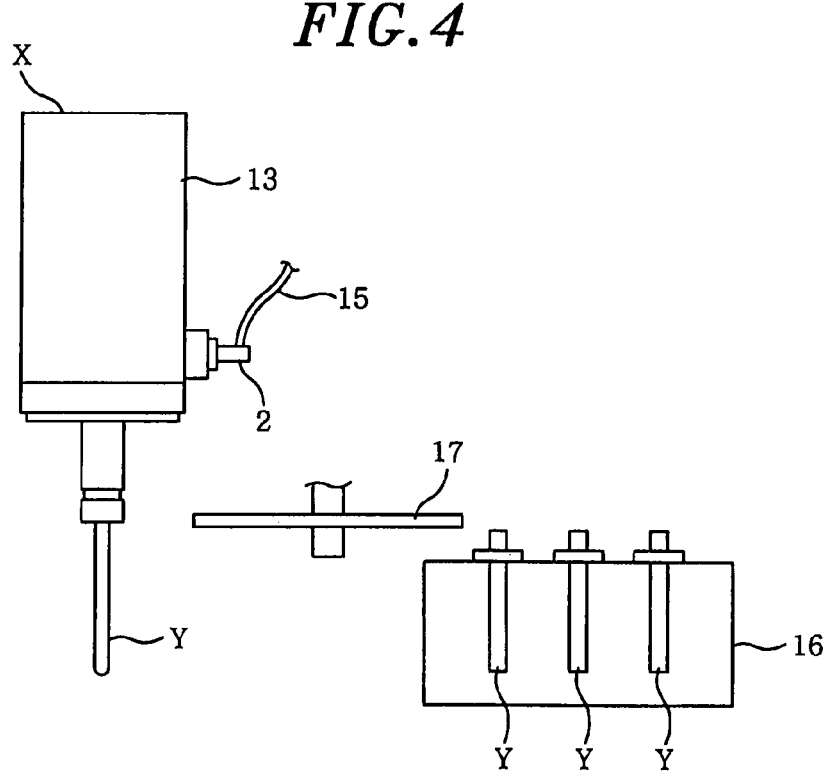
FIG. 4 shows another schematic configuration of the embodiment.

As shown in FIG. 4, a tool magazine 16 accommodates various kinds of tools Y, e.g., a rotating cutter, an endmill, a drill bit, and the like. Further, when the tools Y to be mounted to the driving unit X are changed in the order according to an instruction of a predetermined program, data sets of training samples for the respective tools Y are obtained and stored in the training sample storage 5 and the neural network 1 is trained by using the training samples for the respective tools. In such a trained neural network 1, since the clustering map 4 has zones with which normal categories with respect to the various kinds of tools Y are associated, the machining dimension is required to be estimated with respect to a corresponding tool Y.

Since which tool Y is attached to the driving unit X is known by the program, a zone selecting unit 8 for selecting a zone in the clustering map 4 by following an instruction of the program is provided to the clustering map 4 as a judging unit. The zone selecting unit 8 selects a zone in the clustering map 4 to be used for representing a normal state of each tool Y and estimates the machining dimension corresponding to the check data inputted to the neural network 1 by using the neuron N2 excited from the selected zone in the clustering map 4 by the check data.

Though the output of the vibration sensor 2 serves as the target signal in the embodiment aforementioned, a load current of a motor can be used as the target signal if the driving source of the driving unit X is a motor and if the motor is servo-controlled, an output of an Incoder provided to the motor may be used as the target signal.

While the invention has been shown and described with respect to the embodiments, it will be understood by those skilled in the art that various changes and modifications may be made without departing from the scope of the invention as defined in the following claims.

What is claimed is:

1. A device for estimating machining dimensions of a workpiece by a machine tool which employs one or more tool members each being rotatably driven by a driving unit, the device comprising:

a vibration sensor adapted for detecting vibrations generated from the driving unit;

a characteristics extracting unit adapted for extracting amounts of characteristics having a plurality of parameters from a target signal which is an output of the vibration sensor;

a competitive learning neural network adapted for classifying the amounts of characteristics extracted by the characteristics extracting unit into categories;

a conversion unit adapted for converting, into a machining dimension for a workpiece, the Euclidean distance between an amount of characteristics of a target signal generated by freely rotating a tool member without load attached to the driving unit and a weight vector of an excited neuron for the competitive leaning neural network which has been trained; and an output unit adapted for outputting the machining dimension for the workpiece from the conversion unit as an estimated dimension;

wherein amounts of characteristics of the target signal generated by freely rotating the tool member with out load attached to the driving unit serve as training samples of the tool member for training the competitive learning neural network; and the training samples are inputted again to the trained competitive learning neural network to excite neurons so that the relationships between Euclidean distances and machining dimensions of workpieces are registered in the conversion unit, wherein the Euclidean distances are obtained between weight vectors of the excited neurons and respective corresponding training samples, and the machining dimensions are obtained when the workpieces are machined by the tool members at the same condition as the respective corresponding training samples are obtained.

2. The device of claim 1, wherein the machine tool is configured to automatically change two or more tool members held in a tool magazine in an instructed order, wherein the neural network is trained by using training samples for each tool member, and wherein the conversion unit changes the relationship between the Euclidean distances and the machining dimensions when receiving an instruction to change the tool member in the machine tool.

3. The device of claim 1, wherein if the machining dimension from the conversion unit is out of a tolerance range, the output unit judges that the tool member is defectively attached to the driving unit.

4. The device of claim 2, wherein if the machining dimension from the conversion unit is out of a tolerance range, the output unit judges that the tool member is defectively attached to the driving unit.

5. A method for estimating machining dimensions of a workpiece by a machine tool which employs one or more tool members each being rotatably driven by a driving unit, the method comprising:

detecting vibrations generated from the driving unit;

extracting amounts of characteristics having a plurality of parameters from a target signal which is from the detected vibrations;

classifying the amounts of characteristics into categories by using a competitive learning neural network for;

converting, into a machining dimension for a workpiece, the Euclidean distance between an amount of characteristics of a target signal generated by freely rotating a tool member without load attached to the driving unit and a weight vector of an excited neuron for the competitive learning neural network which has been trained; and outputting the machining dimension for the workpiece as an estimated dimension;

wherein amounts of characteristics of the target signal generated by freely rotating the tool member with out load attached to the driving unit serve as training samples of the tool member for training the competitive learning neural network; and the training samples are inputted again to the trained competitive learning neural network to excite neurons so that the relationships between Euclidean distances and machining dimensions of workpieces are registered, wherein the Euclidean distances are obtained between weight vectors of the excited neurons and respective corresponding training samples, and the machining dimensions are obtained when the workpieces are machined by the tool members at the same condition as the respective corresponding training samples are obtained.

6. The method of claim 5, wherein the machine tool is configured to automatically change two or more tool members held in a tool magazine in an instructed order, wherein the neural network is trained by using training samples for each tool member, and wherein the relationship between the Euclidean distances and the machining dimensions is changed when receiving an instruction to change the tool member in the machine tool.

7. The method of claim 5, wherein if the machining dimension is out of a tolerance range, it is judges that the tool member is defectively attached to the driving unit.

8. The method of claim 6, wherein if the machining dimension is out of a tolerance range, it is judges that the tool member is defectively attached to the driving unit.

* * * * *